United States Patent

[11] 3,612,143

| [72] | Inventor | Aaron J. Ungerer<br>Lakewood, Ohio |
|---|---|---|
| [21] | Appl. No. | 873,229 |
| [22] | Filed | Nov. 3, 1969 |
| [45] | Patented | Oct. 12, 1971 |
| [73] | Assignee | The Standard Products Company<br>Cleveland, Ohio |

[54] APPARATUS FOR LIQUID WASTE DISPOSAL
6 Claims, 5 Drawing Figs.

[52] U.S. Cl. ............................................. 159/16,
159/6, 159/4 I, 159/4 A, 261/79 A, 71/12
[51] Int. Cl. ...................................................... B01d 1/22,
B01d 1/14
[50] Field of Search.......................................... 159/1, 47
WL, 6, 4 A, 4 E, 4 F, 16, 16 A, 4 I; 23/259.1,
259.3; 71/16, 14; 261/79 A; 210/152

[56] References Cited
UNITED STATES PATENTS

| 2,441,613 | 5/1948 | Balassa ........................ | 23/1 |
|---|---|---|---|
| 2,640,532 | 6/1953 | Bowen et al. ................. | 159/4 A |
| 2,847,083 | 8/1958 | Hibshman ..................... | 261/79.1 |
| 3,212,235 | 10/1965 | Markant......................... | 159/4 A X |
| 3,229,749 | 1/1966 | Holmer ......................... | 159/4 E |
| 3,423,173 | 1/1969 | McFarlin et al. ............. | 23/165 D |
| 3,342,337 | 9/1967 | Reid .............................. | 210/152 |

FOREIGN PATENTS

| 2,792 | 1904 | Great Britain ................ | 159/6 |

*Primary Examiner*—Norman Yudkoff
*Assistant Examiner*—J. Sofer
*Attorney*—Meyer, Tilberry and Body

ABSTRACT: Heated gases, such as exhaust gases from an engine, and liquid waste materials are mixed in a container with the hot gases vaporizing the liquid. Cyclonic movement of the gases separates unvaporized liquid droplets from the gas and prevents escape of any liquid from the container. The mixed vapors and gases leave the container through a common outlet. The container may also include means for condensing and separating pollutants such as oil from the gases.

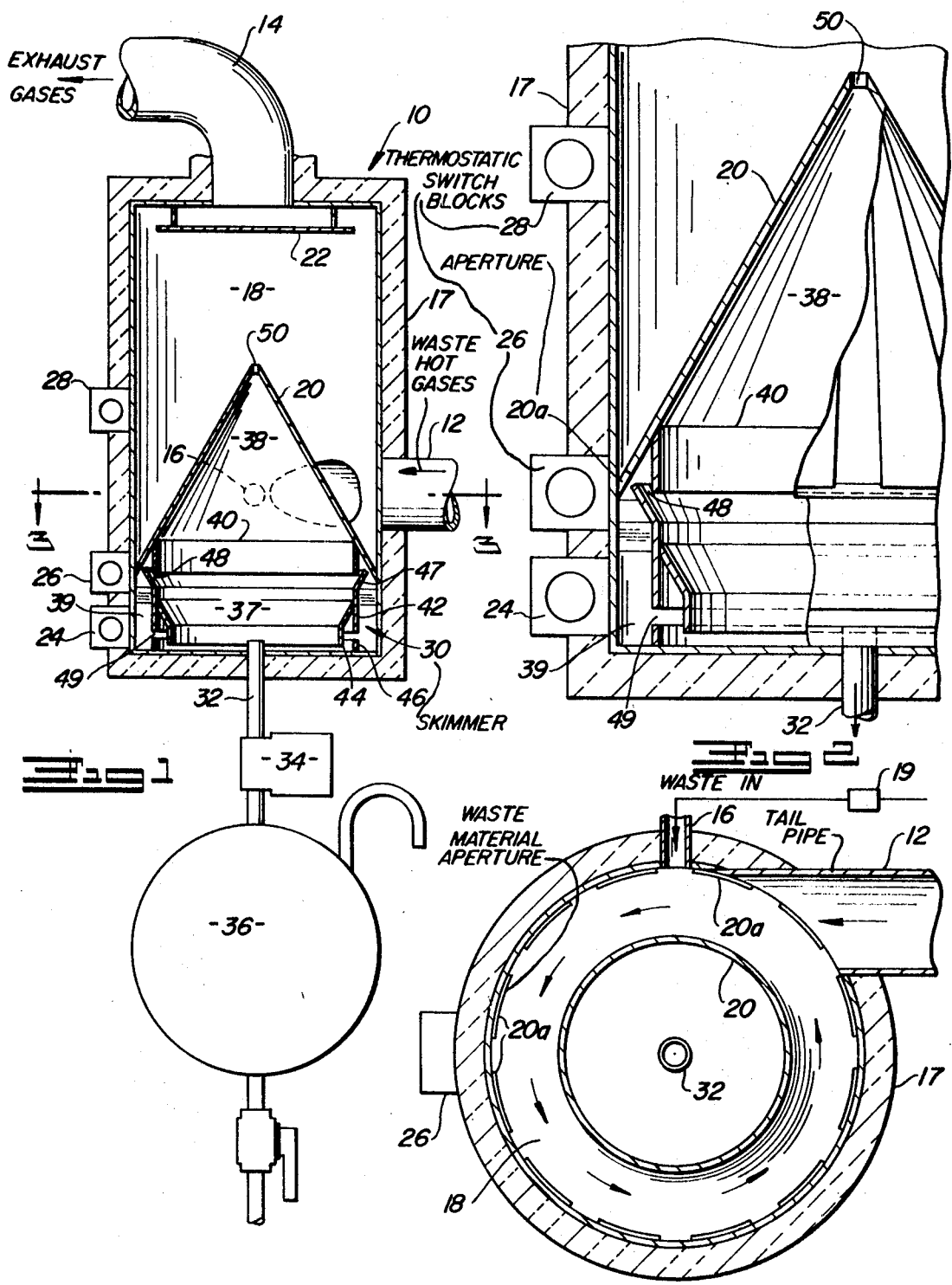

APPARATUS FOR LIQUID WASTE DISPOSAL

This invention relates to the field of waste disposal systems and, more particularly, to a method and system for disposing of liquid waste material by a vaporization process.

Although this invention will be disclosed with particular reference to a waste disposal system for sue in vehicular units for human transportation such as buses, mobile homes, and boats or the like, it will be appreciated that the principles of this invention have broader application and may be used in any system where there are available both hot gases and liquids to be vaporized.

There is disclosed in U.S. Pat. No. 3,342,337 a waste disposal system particularly adapted for vehicular units in which the waste heated gases in the exhaust system of the vehicle are employed to vaporize the effluent from a septic tank. As disclosed in that patent, a drum surrounds a portion of the exhaust conduit with the liquid waste material being injected into the drum and heated to a vaporization temperature by transfer of heat from the exhaust gases through the walls of the exhaust conduit. Although the disclosed arrangement is satisfactory, it is apparent that the efficiency of the unit depends in large part on the heat transfer characteristics of the exhaust conduit. It is apparent that by improving the heat transfer characteristics, a more efficient unit is obtained. However, it is also apparent that there are other limitations, both structurally and economically, which prevent the efficiency of the unit from being the sole controlling design consideration.

This invention seeks to overcome the heat transfer limitations present in the prior art arrangements by employing a container in which the exhaust gases are physically intermixed with the liquid waste material thereby eliminating any medium through which the heat of the gases must be transferred to vaporize the liquid. Moreover, recognizing the increasingly stringent restrictions on the discharge of untreated waste into the atmosphere, this invention includes a method of intermixing the gases and liquids in a manner such that the possibility that droplets of unvaporized liquid may escape from the container is reduced to an absolute minimum. This invention also recognizes the increasing concern about the pollutants carried by the exhaust gases of vehicle engines and includes within the vaporization container means for condensing and removing pollutants such as oil from exhaust gases.

More specifically, the evaporator of this invention comprises a container having a generally cylindrical evaporation chamber into which liquid waste material may be injected. Hot exhaust gases are also injected into the chamber with the gases entering the chamber at a point generally tangential to the chamber. In this manner, a swirling or cyclonic effect is given to the hot exhaust gases. Interior baffles may be employed in the chamber to enhance and maintain the cyclonic action of these exhaust gases. The exhaust gases are physically intermixed with the liquid waste material and carry the waste material in substantially the same path as that followed by the exhaust gases, thereby giving a centrifugal action to the liquid. The outlet for the chamber is spaced substantially above the exhaust gas inlet so that the exhaust gases must pass in a cyclonic action upward before escaping through the outlet. Any droplets of water or other unvaporized material carried along by the swirling gas are, because of the centrifugal action of the moving gases, thrown to the outside where they engage the walls of the container and drain back down to where the heated exhaust gases are entering. The liquid which has been vaporized by the exhaust gases is carried by these gases out through the outlet for final disposal.

The invention further contemplates a separator mechanism for condensing the oil carried in the exhaust gases, separating that oil from the liquid waste material and collecting it where it may ultimately be drained into a sludge tank. The separator mechanism takes advantage of the higher boiling point and lower specific gravity of oil as compared to that of water whereby the oil may be skimmed off and collected for final disposal after the water has boiled away.

Referring now to the drawings wherein like reference numerals indicate like parts in the various views:

FIG. 1 is a sectional view through an evaporator constructed in accordance with the principles of this invention.

FIG. 2 is a fragmentary sectional view on an enlarged scale of a portion of the container of FIG. 1.

FIG. 3 is a sectional view along lines 3—3 of FIG. 1.

Figure 4:
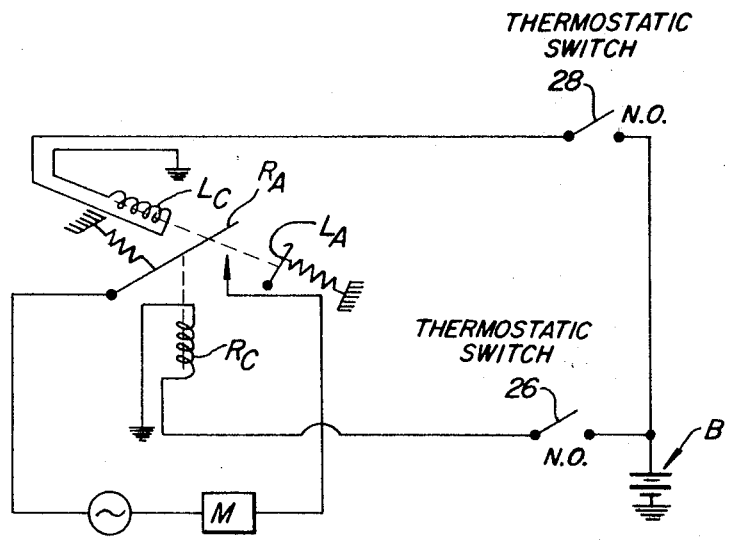
FIG. 4 is a schematic electrical circuit which may be employed with this invention.

Referring now in more detail to the drawings, there is illustrated in FIG. 1 the basic elements comprising the evaporator of the instant invention. These elements include a container indicated generally by the reference numeral 10, an inlet conduit 12 connected to the interior of the container, an outlet conduit 14 and a waste inlet 16 through which liquid waste is injected for vaporization. The container includes a cylindrical vaporization chamber 18 in the interior thereof. The container 10 preferably is covered with insulation 17. It will be appreciated that the waste inlet 16 is connected to a source of waste material such as a septic tank or the like with a pump 19 preferably in the line to withdraw liquid from the tank and inject it into the chamber 18. The inlet conduit 12 is connected to a source of heated gases such as the exhaust conduit of an engine so that the waste heated gases generated by that engine are discharged directly into the vaporization chamber 18.

The exhaust gas inlet 12 is separated a substantial distance from the outlet 14 with the inlet 12 being arranged generally tangential to the chamber 18. This is best viewed in FIG. 3 and, as is apparent from that Figure, the waste inlet 16 is positioned immediately adjacent the conduit 12 so that liquid waste entering through the inlet 16 will be immediately subjected to the hot exhaust gases passing into the chamber 18.

A baffle in the form of a metal cone 20 is positioned within the chamber 18 and comprises a means for enhancing the desired flow path of the exhaust gases within the chamber in a manner to be described hereinafter. Another baffle 22 positioned in the upper region of the chamber 18 helps prevent the escape of any unvaporized liquid through the outlet conduit 14.

Controls governing the introduction of liquid waste material into the vaporization chamber 18 are provided. These controls take the form of heat-sensing thermostatic switch blocks 24, 26, 28 which close with heat and open with temperature drop and are of a conventional construction, commercially available and are only schematically illustrated herein. The blocks 26, 28 are connected through an appropriate circuit with the pump 19 and/or a valve which controls the flow of liquid from the septic tank or other source through the conduit 16. Because of the heat-sensing characteristics of the blocks, it is apparent that the liquid waste material is permitted to enter the chamber only when there is a predetermined temperature level within the chamber. The thermostatic switch blocks also provide a means to prevent overflow of the chamber in that, as the liquid reaches a level corresponding to the block 28, the pump is deactivated and the liquid ceases to flow into the chamber. The block 26 defines a lower level of the liquid. Obviously, other types of controls could be employed as well.

The operation of the evaporator is as follows. Hot exhaust gases enter the chamber through the conduit 12 thereby warming the interior of the chamber until the heat-sensing thermostatic switch blocks 26 and 28 have reached a level at which they are closed, thereby completing a circuit to activate the pump 19. With the pump activated, liquid waste is drawn from the source of waste material and passed through the circuit 16 into the chamber 18. The liquid waste material is immediately subjected to the hot exhaust gases and, because of the tangential orientation of the conduit 12, the hot exhaust gases are given a swirling or cyclonic action within the chamber 18. This cyclonic action is enhanced by the cone 20 which assists in channeling the circumferential flow of the exhaust gases. It will be apparent that the exhaust gases thus flow cyclonically within the chamber 18 while rising upward until the gases escape through the conduit 14. As the hot exhaust gases move within the chamber 18, they are brought into intimate contact with the liquid waste entering through the conduit 16. Since the gases are at an elevated temperature well above the boiling point of water, the liquid waste is vaporized and the vapors join with the hot gases in escaping through the conduit 14. Obviously, the vaporized liquid is sterilized by the vaporization process and is then safe for final disposal along with the hot gases.

Since, as pointed out above, there are stringent regulations against the direct discharge of waste material into the atmosphere, it is important that no droplets of unvaporized liquid are carried out through the conduit 14. The baffle plate 22 will, to some extent, be of assistance in this regard. However, the cyclonic action of the exhaust gases also acts to prevent such an occurrence. Thus, the hot exhaust gases act much like a cyclone separator in that any liquid particles which the hot gas may carry with it are, through the action of centrifugal force, thrown radially outward against the wall of the chamber 18 where these droplets of water will then drain down the wall back to the bottom of the chamber and will again be exposed to the hot gases. The combination of the cyclonic movement of the gases and the spacing of the outlet from the inlets 12 and 16 thus provides a means for preventing the escape of any liquid.

It is contemplated that liquid may be injected through the conduit 16 until such time as both the conduit 16 and the conduit 12 are submerged beneath the level of the liquid in the container. Obviously, appropriate forms of one-way valves must be employed to prevent the liquid from flowing out of the chamber 18 through the conduit 12. Assuming that the level of liquid in the chamber 18 does increase at a rate in excess of the vaporization rate, it will be apparent that the liquid level will begin to build up in the chamber. The cyclonic effect of the exhaust gases will tend to move the liquid in the chamber radially outward and upward so that a substantial amount of liquid will move up the wall 18 until it has reached a point where it overlies the upper thermostatic switch block 28. At this time, the temperature of the wall beneath the liquid and immediately adjacent the thermostatic block begins to drop. As it reaches a predetermined level, the thermostat 28 opens and the operation of the pump is discontinued. Thereafter, the vaporization process continues in the manner described above but the liquid level within the chamber 18 continues to drop until the level is below the thermostat 26, whereupon the pump is started again.

Referring now to FIG. 4, there is schematically illustrated a circuit which, in combination with the thermostatic switch blocks 26, 28, controls the operation of the pump. This circuit includes a motor M for the pump and a source of energy for the motor which may be a battery B. The switch 26 and the switch 28 are combined in a circuit which employs a latching relay. The switch 26 is connected to a relay coil RC which, when actuated, causes a relay armature RA to close the circuit in which the motor for the pump is connected. With the armature RA in the closed position, the motor and the pump are thus operative. The switch 28 is connected in a circuit which latches the relay armature RA in its closed circuit position. Thus, the switch 28 is connected to a latching coil LC. The armature for the coil LC is a latch LA which is physically located adjacent the relay armature RA. As is apparent from FIG. 4, upon closure of the switch 28, the latching coil LC is actuated which draws the latch armature LA to a position overlying the relay armature RA, thereby holding it in engaged position. As a result, even though the switch 26 subsequently may open, so long as the switch 28 remains closed, the latch armature is maintained in a latching position and the relay armature RA is retained in a closed position. Only after switch 28 is opened and the latch armature LA is released by appropriate means such as a spring can the relay armature return to its opened position.

With this type of latching relay, it also is possible for the switch 28 to close before switch 26. Thus, as switch 28 is closed when the water level in container 10 drops below the level of the thermostatic switch block 28, the latching coil LC will be actuated and the latching armature LA will move to a latched position. However, since switch 26 remains open, the relay armature RA remains open and is unaffected by the latch armature. As the water level in the container drops below the level of the thermostatic block 26 and that switch is closed, the relay armature will be moved to a closed position. As the armature RA moves to this position, it acts against the latch armature to cam it back to permit the armature to close on the contact point. After the relay armature passes the latch armature, the latch armature automatically will return to a latched position.

THE SEPARATOR

As noted above, it is contemplated that, in addition to the evaporation unit, it is desirable to incorporate in the unit a means for separating the pollutants from the exhaust gas. This is accomplished in the following manner.

The exhaust gases entering the chamber 18 are lowered in temperature by the liquid waste materials with which it comes into contact. As a result some of the vapors within the exhaust gases are condensed within the chamber 18. For example, oil vapors are condensed and the oil will collect and float on the liquid waste within the chamber. Obviously, if the oil is permitted to remain and accumulate within the chamber, that same oil ultimately will be revaporized and discharged through the conduit 14. Accordingly, means are provided for separating this oil and collecting it where it may periodically be drained into a sludge tank or other appropriate means of disposal.

To separate the oil from the water, a skimmer apparatus, indicated generally by the reference numeral 30, is provided within the interior 38 of the cone 20. In combination with the skimmer apparatus is an outlet tube 32, a solenoid valve 34 and an oil sludge tank 36. The oil skimmed by the skimming apparatus 30 is collected within the interior 38 of the cone 20 and, through operation of the solenoid valve 34, it is periodically removed through the tube 32 into the oil sludge tank 36.

Referring now more in detail to the skimming apparatus 30, this comprises a plurality of concentric, substantially circular baffles 40, 42, 44 and 46 which are arranged within the interior space 38. The baffles are spaced from the sidewalls of the container and define an outer chamber 39 and an inner chamber 37.

The baffle 42 includes an upper flared portion 47 which cooperates with the lower edge of the baffle 40 to define an upper flow passage 48 therebetween. The lower edge of baffle 42 cooperates with the baffle 46 to define a lower flow passage 49. The lower edge of baffle 44 extends below the upper edge of baffle 46 for a purpose to be described hereinafter.

The cone 20 includes a plurality of notches or apertures 20a around its lower outer periphery. These notches providing small passages by which the water and the condensed oil may flow down below the cone 20 into outer chamber 39. The cone also includes an opening 50 at its apex whereby vapors generated within the cone may escape into the chamber 18 and out into the outlet 14.

The separator apparatus functions in the following manner. Assuming the condensation of some of the oil within the exhaust gases, the oil and liquid will accumulate and run down through the notches 20a into chamber 39. The accumulating liquid and oil will initially flow through the passage 49 onto the interior 37 of the skimming apparatus. As the liquid level builds up in the outer chamber 39, the liquid level will also increase within the inner chamber 37. However, once the liquid level has risen above the upper edge of the passage 49, it will be apparent that only water will thereafter flow through that passage 49 into the interior 37. This is so since, as is well known, oil floats on water and any accumulation of oil in the outer chamber 39 will be on the upper surface of the liquid in that chamber and, hence, above passage 49. As a result, there will be a layer of oil in the outer chamber 39 which will continue to increase in depth in that chamber. The depth of this oil level will continue to build up until such time as the liquid level in chamber 39 has reached a point corresponding to the upper edge of the flared skirt 47. Thereafter, this flared skirt 47 will serve as a skimmer in the sense that the oil floating on top will begin to spill over through the passage 48 into the interior 37. The level of liquid in chamber 37 normally will be somewhat lower than chamber 39 since there will be a higher evaporation rate from the larger exposed surface. Moreover, there is a continuous cooling effect as new liquid drains into chamber 39. The oil level will then begin to build up within chamber 37.

After the pump has stopped injecting liquid waste material into the evaporator, the exhaust gases will continue to evaporate the liquid until all of the liquid in the chamber 18 has been evaporated. Thereafter, the exhaust gases will continue to heat the interior of the container and thus will continue to evaporate such liquid waste as may be accumulated within the interior 38 of the cone 20. Since the boiling point of water is considerably lower than that of oil, it will be apparent that the accumulated water within the interior 38 will be evaporated first. As the water is evaporated, the liquid level including that of the oil will continue to drop both in the chamber 39 and the chamber 37 until such time as the thermostatic block 24 is no longer covered by liquid. At this point, the block 24 will sense a rise in temperature and operate the solenoid valve 34 thereby connecting chamber 37 with tank 36. Since the internal pressure of the unit is substantially above atmospheric pressure, the floating oil in chamber 37 is forced down the tube 32 into the oil sludge tank 36.

The overlap of the baffle 44 with the passage 49 acts as a liquid trap to prevent the back flow of oil from the chamber 37 into the chamber 39.

Figure 5:
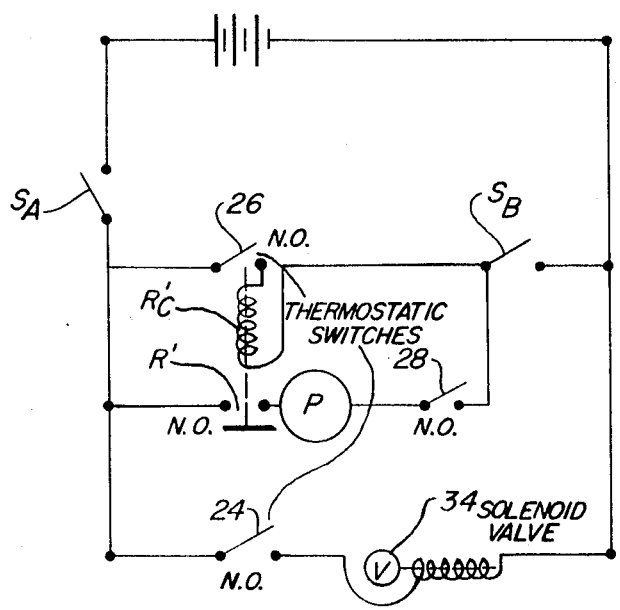
FIG. 5 is an alternative schematic electrical circuit which may be employed with this invention.

Referring now to FIG. 5, there is illustrated an alternate electrical schematic arrangement for operation of the above-described device. As shown in that Figure, the switches 24, 26 and 28 correspond to the thermostatic switch blocks illustrated in FIG. 1. The switch $S_A$ is a manual switch which shuts off the entire unit and the switch $S_B$ is a manual switch for shutting off the pump P. The coil of the solenoid valve 34 is included in the circuit of FIG. 5. In addition, there is illustrated a relay R' having normally opened contacts and a relay coil $R'_C$.

The circuit of FIG. 5 functions to control operation of the mechanism of FIG. 1 in the following manner. Assuming the unit is cold and the engine is then started, the thermostatic switch 26 is heated to a temperature of 100° F. at which point it closes and energizes the relay coil $R'_c$ to close the contacts on relay R'. The pump P is now in the condition where it will start when the thermostatic switch block 28 reaches a predetermined temperature, for example 220° F. When the thermostatic switch block 28 reaches this temperature, it closes and the pump P is then started to introduce liquid waste material through the conduit 16 into the chamber 18. The liquid continues to enter the chamber 18 until it reaches a level corresponding to the level of the thermostatic switch block 28 at which time the liquid causes the temperature of thermostatic switch block 28 to fall below that required to maintain it closed. As the block 28 cools, the switch opens and it stops operation of the pump P. The liquid in the chamber 18 then continues to evaporate until such time as the liquid level drops below the block 28. At that point, the heated gases to which the block 28 is exposed causes the block again to rise to a temperature of 220° F. at which point it will close to restart the pump P.

In the event that all of the liquid is exhausted from the source from which it is being drawn, it will be apparent that the liquid in the unit will continue to evaporate until the liquid level drops below the thermostatic switch block 24. At this point, the block 24 is exposed and will be heated to a predetermined temperature, for example 250° F. The thermostatic switch block 24 will then close and actuate the solenoid valve 34 to drain the oil collected in chamber 37 into the sludge tank, in the manner described above.

Periodic purging of the chamber can also be accomplished simply by actuating the manual switch $S_B$ which will deactivate the pump P. At this point, the unit will operate in a manner similar to that described above in which the source of liquid has been exhausted. Once the unit has been purged, the switch $S_B$ may be reclosed and the unit will then resume normal operation.

Having thus described my invention, I claim:

1. An evaporator for vaporizing liquid comprising: a substantially cylindrical container, first conduit means connected with said container for supplying liquid having a predetermined boiling point temperature thereto, second conduit means connected with said container for supplying heated gases having a temperature substantially greater than said predetermined boiling point temperature thereto, said second conduit means communicating substantially tangentially with said container and said first conduit means communicating with said container adjacent said second conduit means, gas vapor outlet conduit means communicating with said container above said first and second conduit means, pump means including an electrically energized drive means for supplying liquid to said container through said first conduit means, control means for controlling operation of said pump means, said control means including thermostatic switch means connected with said container wall and with said drive means, said thermostatic switch means being responsive to the temperature of said heated gases to close and energize said pump drive means and being also responsive to said predetermined boiling point temperature of said liquid to open and deenergize said electrically energized drive means for pump means.

2. The device of claim 1 wherein said container has a top portion and said outlet conduit means is connected with said top portion, and baffle plate means positioned in said container in spaced and aligned relationship to said outlet conduit means, whereby gases and vaporized liquid flow outwardly around said baffle plate means prior to exiting out said outlet conduit means.

3. The device of claim 1 wherein said container includes a bottom portion, sludge oil tank means in said bottom portion of said container for collecting sludge and oil therein, and sludge oil outlet conduit means communicating with said sludge oil tank means for draining sludge and oil therefrom.

4. The device of claim 3 and further including solenoid valve means in said sludge oil outlet conduit means, second thermostatic switch means connected with said container for opening and closing said valve means, said second thermostatic switch means being responsive to temperature of said gases above said predetermined boiling point temperature of said liquid to close and open said valve means, said second thermostatic switch means being responsive to said predetermined boiling point temperature to open and close said valve means.

5. An evaporator for vaporizing liquid comprising; a substantially cylindrical container, first conduit means connected with said container for supplying liquid having a predetermined boiling point temperature thereto, second conduit means connected with said container for supplying heated gases having a temperature substantially greater than said predetermined boiling point temperature thereto, said second conduit means communicating substantially tangentially with said container and said first conduit means communicating with said container adjacent said second conduit means, gas vapor outlet conduit means communicating with said container above said first and second conduit means for exhausting gases and vaporized liquid from said container, said container having a top wall and a bottom wall, a substantially conical baffle positioned in said container, said conical baffle having a large diameter base portion positioned above said bottom wall of said container and below said first and second conduit means, said conical baffle having a small diameter apex portion positioned below said top wall of said container and said outlet conduit means and above said first and second conduit means.

6. The device of claim 5 and further including a substantially cylindrical third baffle having a top edge and a bottom edge, said conical baffle having a conical inner wall surface, said top edge of said third baffle contacting said conical inner wall surface, said bottom edge of said third baffle being positioned below said top edge of said second baffle, and said bottom edge of said third baffle having a diameter less than the diameter of said top edge of said second baffle.